United States Patent [19]

McNeill et al.

[11] 4,070,612
[45] Jan. 24, 1978

[54] METHOD AND APPARATUS FOR MEASURING TERRAIN RESISTIVITY

[75] Inventors: James Duncan McNeill, Mississauga; Gary George Black, Bramalea; Miroslav Bosnar, Don Mills, all of Canada

[73] Assignee: Geonics Limited, Missauga, Canada

[21] Appl. No.: 692,057

[22] Filed: June 2, 1976

[51] Int. Cl.² ............................................. G01V 3/10
[52] U.S. Cl. ..................................................... 324/6
[58] Field of Search ...................................... 324/3, 6

[56] References Cited

U.S. PATENT DOCUMENTS

| | | | |
|---|---|---|---|
| 3,052,837 | 9/1962 | Arbogast et al. | 324/3 |
| 3,214,686 | 10/1965 | Elliot et al. | 324/6 |
| 3,259,838 | 7/1966 | Thomsen | 324/6 |
| 3,555,409 | 1/1971 | Atwood et al. | 324/6 |
| 3,609,522 | 9/1971 | Hutchins et al. | 324/6 |
| 3,614,600 | 10/1971 | Ronka | 324/6 X |
| 3,758,848 | 9/1973 | Dowling | 324/6 |
| 3,826,973 | 7/1974 | Pflaum | 324/6 X |

*Primary Examiner*—Gerard R. Strecker
*Attorney, Agent, or Firm*—Ridout & Maybee

[57] ABSTRACT

Apparatus is provided which may be made portable and is calibrated to provide direct readings of terrain conductivity. Transmitter and receiver coils are separated by less than one tenth of the electrical skin depth in terrain having a maximum conductivity to be measured, at the frequency of alternating current signal applied to the transmitter coil, and the signals picked up by the receiver coil are processed to cancel received signal components in phase with the transmitted signal and amplify a received quadrature component so as to provide a direct indication of ground conductivity. The in-phase component received direct from the transmitter coil is cancelled by a preset equal and opposite component, and the in-phase component of the secondary signal received from the terrain is substantially cancelled by a form of negative feedback, in order to avoid swamping of the wanted signal. Optionally, the negative feedback is disabled and the in-phase component is displayed in order to provide an indication of the magnetic susceptibility of the terrain being surveyed.

17 Claims, 2 Drawing Figures

METHOD AND APPARATUS FOR MEASURING TERRAIN RESISTIVITY

FIELD OF THE INVENTION

This invention relates to an instrument for measuring terrain conductivity.

REVIEW OF THE PRIOR ART

It is known that terrain conductivity measurements provide useful information for the purposes of geological mapping, and techniques have been developed for this purpose. For example, electrodes may be implanted in the terrain and the necessary measurements made directly. The electrode technique, although capable of providing accurate readings of a wide range of terrain characteristics, is cumbersome and laborious, as the electrodes must be reimplanted for each separate measurement.

It has also been proposed to provide non-contacting electromagnetic devices either airborne or for use on the ground. In one such device a transmitter and receiver were supported at opposite ends of a carrying frame, the receiver being equipped with a meter which indicated the degree of coupling via the terrain between the receiver and the transmitter, which was influenced inter alia by the resistivity of the terrain. However such an instrument could not by itself directly measure terrain resistivity and merely provided a hybrid output influenced by various terrain parameters of which resistivity was only one. Instruments have also been proposed incorporating separately portable search coils, but these are difficult to use because the magnitude of the direct signal received by the receiver coil from the transmitter coil is critically dependent on the separation between the coils, and variations in the direct signal can be large compared with the wanted secondary signal received from the terrain. Moreover, the readings of all these non-ground contacting electromagnetic techniques are difficult to interpret.

In spite of these disadvantages there has over the past decade been substantially increased interest in the possibility of measuring terrain resistivity through the use of non-contacting electromagnetic techniques mentioned above. Such techniques have been described in the following articles:

1. Electromagnetic Fields About a Loop Source of Current (Rhu, J., Morrison, H. F. & Ward, S. H. Geophysics Vol. 35 No. 5 p. 862)
2. Inductive Sounding of a Layered Earth With a Horizontal Magnetic Dipole (Dey, A. & Ward, S. H. Geophysics Vol. 35 No. 4 p. 660)
3. Electromagnetic Depth Sounder (Inouye, G. T. Bernstein, H. & Gaal, R. A. IEEE Transactions on Geoscience Electronics Vol. GE8 No. 4 p. 336).

In all of these techniques an alternating current is fed into a coil which is located either on the surface or above the surface of the earth. The magnetic field from this alternating current induces eddy currents in the earth which are in some way related to the resistivity of the earth and the resulting magnetic field from these induced eddy currents is subsequently sensed by a second coil which acts as a receiver coil. Various properties of the magnetic field arising from the sub surface induced currents can be used as a basis for interpreting the terrain conductivity in the case where the ground is assumed to be homogeneous down to very large depths, or indeed to detect layering where the ground is assumed to have different layers each of different thickness and conductivity or resistivity. The interpretation schemes are usually rather complicated and in some cases yield little information about the resistivity of the uppermost layer since the curves tend to be rather similar in many cases.

On reading the above references it is apparent that all the calculations carried out to date have used a so called induction number as the independent variable. This induction number is defined as the ratio of the intercoil spacing to the skin depth in the upper layer. It can be shown that this induction number elegantly groups the various variables such as frequency of the alternating current, conductivity or resistivity of the upper layer, etc., in a very useful normalized form, as discussed in "Fields about an Oscillating Magnetic Dipole over a Two-layer Earth and Application to Ground and Airborne Electromagnetic Surveys (Frischknecht, F. C., Quarterly of the Colorado School of Mines Vol. 62 No. 1)".

Referring again to the papers referred to above it is seen that the calculations have been carried out for values of this induction number within the range 0.1 to 10. That is the calculations have been carried out for a coil spacing which varies from 1/10 of the skin depth in the upper layer to approximately 10 times the skin depth in the upper layer. The reason for doing this is that the scattered fields tend to be largest for this range of induction number and thus their measurement tends to be relatively simple. However, measurement over this range of induction number results in an intercoil spacing which is of the order of or larger than a skin depth, leading to a rather confusing intermingling of two separate effects; vis the power law fall off of the current flow in the ground from the transmitting dipole, and the added modification of this fall off by virtue of propagation effects which are represented by the finite skin depth.

Small coil spacings less than one tenth of the skin depth have been avoided since at such spacings the direct primary signal received by the receiver coil from the transmitter coil is normally very large compared with the secondary signal received from the terrain, making it difficult to separate and process this latter signal and making the instrument extremely susceptible to false indications produced by minor changes in the distance between the coil or in the coil geometry.

Furthermore, instruments of this type have been used primarily for the detection of ore bodies which usually exhibit very low resistivities and thus correspondingly small skin depths. As a result, coil spacings which are small compared with the skin depth would result in a very small instrument capable only of detecting ore bodies close to the terrain surface. Thus the interpretation of surveys for ore bodies carried out with instruments having large coil spacings necessarily included both the in-phase and quadrature phase components of the received signal to extract the maximum information from the data.

The present invention provides an instrument which has the advantage of non-ground-contacting electromagnetic techniques of being easy and rapid to use, but which at the same time retains many of the advantages of the electrode technique without any necessity for ground contacting electrodes. Moreover, the invention can readily be embodied in a portable instrument suitable for one man operation.

We have found that at coil spacings which are very small compared to the electrical skin depth, it can be shown mathematically and confirmed experimentally that for most non-coaxial coil configurations the terrain conductivity is closely proportional to the quadrature component of the secondary signal, whereas at larger spacings this linearity is no longer true and furthermore the in-phase component is also significant. Since the false indications referred to above primarily involve in-phase components, we have found it practicable when using measurements only of quadrature phase components to use coil spacings which are very small compared with the skin depth, although it is preferred to include means to cancel the in-phase signals as far as possible so as to reduce the dynamic range required of the signal processing circuits. By this means instrumental sensitivity to small changes in intercoil spacing or coil orientation is greatly reduced.

Furthermore, we have found that by not attempting to make accurate measurements of very low resistivities, it is possible to provide a simple instrument capable of very rapidly surveying terrain resistivity to useful depths and which furthermore can not only readily provide information as to the resistivities of different layers in the terrain much more readily than known instruments, but can also provide particularly accurate resistivity readings except in the case of terrain of very low resistivity.

According to the invention therefore, a method of measuring terrain conductivity comprises generating an alternating current having a frequency of F Hertz and applying the same to a transmitter coil for transmission to the terrain, receiving signals from the terrain by means of a receiver coil spaced from the transmitter coil by a distance of not more than about $50/\sqrt{FG}$ meters where G is the highest terrain conductivity to be measured in mhos/meter and isolating the quadrature component of the received signal to provide a signal proportional to terrain conductivity.

Preferably, the in-phase components of the received signal are substantially cancelled prior to recovery of the quadrature component.

The expression quoted above to determine the maximum spacing between the coils represents approximately one tenth of the electrical skin depth at frequency F of terrain having a conductivity G.

The invention extends to apparatus for measuring the conductivity of terrain comprising a transmitter coil, a receiving coil spaced from the transmitter coil, signal generating means connected to the transmitter coil to supply an alternating current thereto, signal processing means connected to receive signals from the receiver coil and the signal generating means and compare said signals so as to isolate from the signal from the receiver any component in quadrature with that from the generating means, and means responsive to said quadrature component and calibrated to display or record the conductivity of terrain being surveyed, the spacing D of the coils in meters and the frequency F of the alternating current in Hertz being such that D does not exceed about $50/\sqrt{FG}$ where G is the maximum terrain conductivity to be measured, in mhos/meter.

Preferably the meter includes means to apply to the signal processing equipment together with said signal from the receiver coil a cancelling signal derived from the signal generating means which substantially cancels, that component of the receiver coil signal which is a primary signal component transmitted directly from the transmitter coil. This enables the wanted quadrature signal to be amplified without the amplifier being overloaded by the much larger in-phase signal. Since the secondary signal component received from the terrain includes an in-phase component which can vary under the influence of terrain parameters other than resistivity and can be of large magnitude, means are preferably provided to monitor the signal being processed for the presence of such an in-phase component, and to provide an additional cancelling signal to minimize this component.

Within the relationship of D, F and G specified above, we have further found that not only is the quadrature component of the received secondary signal component proportional to the conductivity of the terrain, but the in-phase component of the received secondary signal component is proportional to the magnetic susceptability of the terrain. Thus by monitoring the in-phase signal, without providing the additional cancelling signal referred to above, the same instrument may be used to measure the magnetic susceptibility of the terrain. The technique thus employed for this purpose is in fact known, but known instruments for this purpose have utilized transmitting and receiving coils which are close together, usually coaxial. We have found that these coils may in fact be substantially spaced provided so long as that in-phase component of the secondary signal due to changes in magnetic coupling between the coils engendered by terrain susceptibility remains very large compared to in-phase components due to induced currents in the terrain, which latter only become significant when D becomes greater than about one tenth of the skin depth of the terrain at frequency F. It is of course important in measuring the secondary in-phase signal that the primary signal from the transmitter be accurately cancelled which entails in turn the distance between and relative orientation of the coils be maintained very stable which is difficult to achieve in those embodiments where the coils are independently moveable.

SHORT DESCRIPTION OF THE DRAWINGS

Exemplary embodiments of the invention are described further with reference to the accompanying drawings, in which:

FIG. 1 is a diagrammatic illustration of the mechanical aspects of one preferred form of terrain conductivity meter, and FIG. 2 is a block schematic diagram of the electronic aspects of the meter.

DESCRIPTION OF THE PREFERRED EMBODIMENTS

Figures 1, 2:
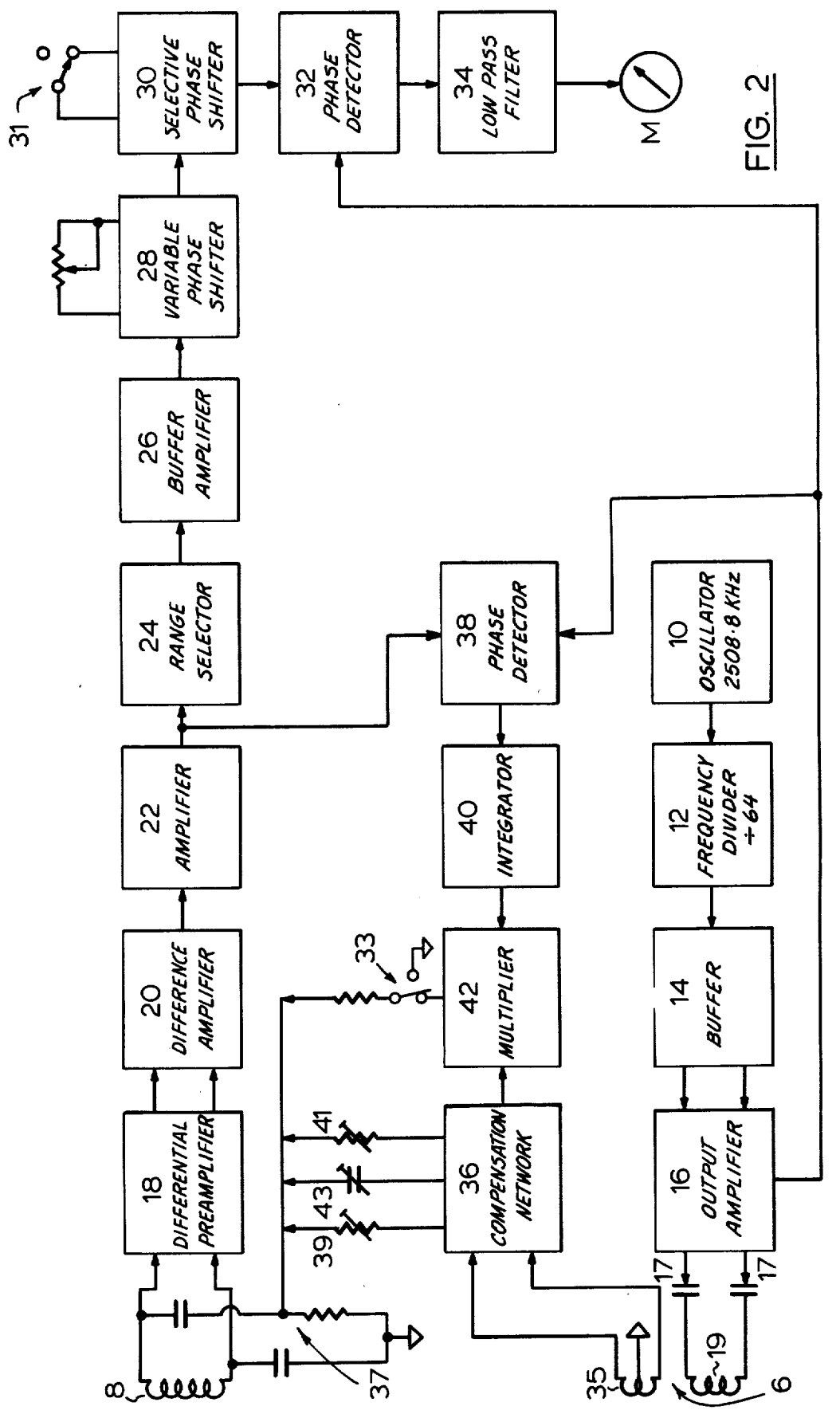

Referring to FIG. 1, the meter comprises in one form a rigid horizontal boom 2 which may be of any strong, rigid, light weight, non-ferromagnetic material, material, for example wood or fibre reinforced synthetic resin. At the centre of the boom is an enclosure 4 which contains the electronic components of the apparatus, including signal generating means and signal processing means, with the exception of a transmitter coil assembly 6 and a receiver coil 8 mounted in or on opposite ends of the boom. Although the coils are shown with their axes substantially vertical, various alternative orientations of the coils are possible as will be understood by those skilled in the art.

In use, a person operating the instrument grasps the boom (or suitable hand grips, not shown) to either side of the enclosure 4, and carries it over terrain T to be surveyed whilst observing conductivity or resistivity readings on a meter M, which may be of a recording type. A visual indication from the meter, if of a recording type, could be replaced by an audible signal or even theoretically dispensed with, although it is desirable that the operator should have an indication of the readings being obtained so that he may relate any anomalies in resistivity to the location at which they occur. In a typical case, the boom dimensions are such that the axes of the coils 6 and 8 are separated by 3.7 meters (12 feet), although instruments no more than a quarter of this length (e.g. about 1 meter) are useful in certain applications.

The instrument thus far described has employed a fixed separation between the coils. In the event that the underlying terrain can be represented by a homogeneous half space the instrument will, if the frequency and coil spacing are chosen as indicated below, accurately indicate the conductivity of the half space.

If on the other hand, the earth is layered, the instrument will respond to the conductivity of both of the layers. If the upper layer is very thick the instrument will respond solely to the conductivity of the upper layer; as the thickness of the upper layer decreases the readings will be monotonically influenced by the lower layer, until in the limit as the upper layer becomes very thin, the instrument will accurately measure the conductivity of the lower layer.

Thus a survey carried out with an instrument at fixed intercoil spacing is completely analogous to a conventional Wenner spread resistivity survey carried out at fixed electrode spacing. Such a survey will be of a reconnaissance type.

If layering is anticipated, and more information is desired about such layering, the normal technique with electrode surveys is to expand or contract the interelectrode spacing. In a completely analogous manner it is possible to expand or contract the intercoil spacing, if necessary adjusting the frequency so that the skin depth criterion is always fulfilled as described above. In this fashion a small intercoil spacing is used to survey essentially the uppermost layer, a large spacing the lower layer, etc.

Thus in an alternative form of the meter, the transmitter coil assembly and the receiver coil are formed as separately portable units, the signal generating means being associated with the transmitter coil assembly and the signal processing means and the meter with the receiver coil. The units are connected by a flexible cable establishing the necessary electrical interconnections. In this form of the meter, the spacing between the coils may be varied, typically to selected distances between 2 and 50 meters for normal applications; for example provision may be made for the coils to be separated by 32, 16, 8 or 4 meters. In certain applications, for example in determination of permafrost depth, where greater terrain depths are surveyed, coil separations in an extended range up to 500 meters will be appropriate.

Referring now to FIG. 2, the electronic components in the enclosure 4 comprise signal generating means comprising circuit blocks 10, 12, 14, 16, signal processing means comprising circuit blocks 18, 20, 22, 24, 26, 28, 30, 32, 34, and unwanted signal cancellation means comprising circuit blocks 36, 38, 40 and 42.

The signal generating means comprises a crystal controlled oscillator 10, the frequency of which is selected to give, when divided down in a frequency divider 12, an output signal from buffer amplifier 14 having a frequency which in the case of an instrument having a 3.7 meter boom may be 39.2 kHz. Where the coils are independently portable, the division ratio is preferably adjustable so as to provide alternative frequencies, for example 492, 1969, 7876 and 31504 Hz for use respectively with each of the alternative coil spacings exemplified above. With extended coil spacings, proportionately lower frequencies will be appropriate. Neither the frequencies chosen nor the division ratio nor even the presence of the divider are critical, subject to the limitations discussed below, but frequency division enables a suitable l.f. signal to be obtained using a cheaper and more stable crystal in the oscillator, and also enables a number of alternative frequencies to be generated readily, having predetermined ratios to one another. The output frequency or frequencies should be selected so as not to be a harmonic of the local electricity supply frequency and so as not to interfere with radio communications. The primary factors influencing selection of the frequency used are the requirement on the one hand that the skin depth of the terrain should be great enough to exceed the separation of the coils by a factor of at least ten throughout the range of terrain conductivities to be measured, and a requirement on the other hand that the amplitude of the quadrature component of the secondary signal picked up by the receiver coil from the terrain should be as large as possible compared with the much larger in-phase signal received directly from the transmitter coil. The first factor favours adoption of as low a frequency as possible, whilst the latter factor favours adoption of as high a frequency as possible. As is discussed further below, it is preferred to adopt different frequencies when alternative coil separations are employed; where the frequency is maintained at a constant ratio to the inverse square of the coil separation, the ratio of the quadrature component to the primary signal will, for a given terrain conductivity, remain constant, providing an important advantage discussed further below. Whilst the selection of frequencies used must necessarily involve an element of compromise, we believe that the best results, at least over the range of terrain conductivities from 0.0001 to 0.005 mhos/meter, are obtained when the frequency F in Hertz is approximately $10^6/2D^2$ where D is the coil separation in meters. The particular frequencies exemplified meet the above requirements and have an advantage discussed further below when used in conjunction with the particular coil separations exemplified above.

The signal from the buffer amplifier 14 is passed to an output amplifier 16 and thence via tuning capacitors 17 to a transmitter coil 19 which forms part of the transmitter coil assembly 6.

The receiver coil 8 picks up a primary signal transmitted by the transmitter coil 19 and a secondary signal set up by currents induced in the terrain by the primary signal. In order to avoid the secondary signal being swamped by the primary signal, a reference coil 35 also forming part of the transmitter coil assembly and tightly coupled with the coil 19 is used to supply a component of a cancellation signal applied to the receiver coil 8 through a summing network 37 or by inductive coupling such that the component is applied in antiphase to the primary signal received by the coil 8 direct from the coil 6. A compensation network 36 provides preset coarse and fine adjustments 39 and 41 of the in-phase amplitude, and a preset fine adjustment 43 of the quadrature phase of the component applied so that it exactly cancels the primary signal received by the coil 8. A further component of the cancellation signal is supplied to the network 37 from a multiplier 42, having been derived in a manner to be described below so as substantially to cancel that component of the secondary signal received by the coil 8 which is in phase with the primary signal.

The remaining uncancelled signal from the coil 8, consisting essentially of the quadrature component of the secondary signal received by the coil, is passed successively to a differential preamplifier 18, a difference amplifier 20, a further amplifier 22, an attenuator 24, the attenuation of which can be switched to different values, and a buffer amplifier 26. The phase of the amplified signal is adjusted by a phase shifter 28 so as to be exactly in phase with the signal provided by the amplifier 16, and its phase is then shifted through 90° by a further phase shifter 30 whereupon it is applied to a synchronous detector 32 together with a signal from the output amplifier 16. The output signal from the synchronous detector, after passage through a low-pass filter 34, provides an output signal proportional to the quadrature component of the secondary signal which may be applied to the meter M to provide a direct reading of terrain conductivity, or, by use of a reciprocal scale, terrain resistivity. Different conductivity or resistivity ranges may be obtained by switching the gain of the attenuator 24. Where more than one alternative signal frequency is to be utilized, the phase shifters 28 and 30 must be provided with appropriate alternative characteristics to achieve the required phase shift at each frequency utilized, and appropriate alternative settings must also be provided for other phase or frequency sensitive circuit elements.

Alternative settings must also be provided determining the amplitude of the signal applied from the network 37 to cancel the primary signal from the transmitter coil 19 for each combination of coil spacing and frequency which is to be used. If the coil spacings and frequencies selected are such that the frequency always bears a constant ratio to the inverse square of the spacing, as is preferred, then for a given terrain conductivity the amplitude of the quadrature component of the received secondary signal will bear a constant ratio to the amplitude of the received primary signal. Therefore to maintain the meter calibration for different such frequency and spacing combinations, it is only necessary to change the sensitivity of the meter in inverse proportion to the changes in the cancellation signal for the different combinations.

The output of the amplifier 22 is also taken to a further synchronous detector 38 together with an output from the output amplifier 16, the output of the detector 38 being proportional to the residual in-phase component of the secondary signal picked up by the coil 8. The output is integrated by means of an integrator 40 to provide an error signal which is applied to the multiplier 42 along with the signal from the reference coil 35, the error signal thus controlling the amplitude of the signal applied to the network 37 substantially to cancel the in-phase component except for the small residue required to generate the error signal.

To enable the compensation network 36 to be adjusted, a switch 31 is provided enabling the phase shifter 30 to be selectively disabled so that the meter M indicates the in-phase rather than the quadrature component of the signal picked up by the coil 8. If the output of the multiplier 42 is disabled by a switch 33, and the instrument taken to a location where the terrain resistivity is known to be very high, so that the secondary signal, and in particular its in-phase component, due to ground currents, is very low, the controls 39, 41 and 43 can then be adjusted for a null reading on the meter indicating substantial cancellation of the in-phase primary signal picked up by the coil 8.

However, it is found that the total in-phase component of the secondary signal was much larger than would be accounted for by the effect of induced ground currents. The additional in-phase signal is caused by magnetic coupling between the coils, the magnitude of the signal being essentially directly proportional to the magnetic susceptibility of the terrain in the half-space beneath the instrument, assuming this to be uniform. The magnitude of the signal due to terrain susceptibility is strongly dependent on the height of the instrument above the terrain surface, and a null will be obtainable by raising the instrument to an appropriate height, typically from about one third of the boom length to one boom length. This enables the network 36 to be adjusted for precise cancellation of the in-phase primary signal by substantially eliminating the secondary signal component due to terrain susceptibility, which when measuring conductivities within the range of the instrument, will be the only significant component of the secondary in-phase signal. It follows that, when the ground conductivity is sufficiently low to be within the range of the instrument, the magnitude of the in-phase component of the secondary signal is proportional to the magnetic susceptibility of the terrain. This will be discussed further below.

Cancellation of the in-phase components of the received signal has the great advantage that the amplifiers 18–24 and the detector 32 are not swamped by these components, which can be very large compared with the wanted quadrature component. Over a range of terrain conductivities which for the frequencies and coil spacing exemplified extends from less than 0.0001 mho/meter to about 0.005 mho/meter it can be shown that this quadrature component is close to linearly proportional to terrain conductivity, and even at higher conductivities up to 0.05 mho/meter the degree of correspondence is quite useful. Greater accuracy at the higher end of the conductivity range may be obtained by applying a correction factor to the meter reading to compensate for the departure from strict linearity or by reducing the frequency at the higher conductivities and suitably modifying the instrument gain. Moreover, with the coil separations and transmitted frequencies exemplified above, the product of terrain resistivity and the amplitude ratio of the quadrature component to the primary, in-phase component of the received signal is unity, thus simplifying calibration of the instrument. This relationship also holds true for other combinations of coil separation and frequency in which the same ratio is maintained between the frequency and the inverse square of the coil separation.

When the instrument has provision for the use of alternative coil spacings as disclosed above, it is possible to easily investigate the respective conductivity of different layers of the terrain. If the changes in coil spacing are accompanied by frequency steps such that different frequencies maintain a constant ratio to the inverse squares of the corresponding coil spacing, the meter reading for a given terrain will remain constant if its sensitivity has been adjusted as discussed above and if the terrain has a homogeneous resistivity throughout the depth investigated. A change in resistivity as the spacing is reduced indicates the presence in the terrain of layers of different resistivity, and a series of readings at different spacings will normally enable the number, thickness and individual resistivities of these layers to be ascertained by matching with theoretical curves in a manner completely analagous with conventional (i.e. Wenner) resistivity techniques.

Whilst the specific embodiments of the invention described will not provide accurate terrain resistivity readings when conductivities above about 0.005 mho/meter are involved and therefore cannot provide accurate resistivity reading for highly conductive ore bodies, such bodies will of course nevertheless be detected as anomalies in the results obtained; and much more comprehensive data can be obtained concerning surrounding strata of lower conductivity than is possible with conventional instruments of the electromagnetic non-contacting type. Indeed, for medium and low conductivity terrains, the readings obtained are comparable to or superior in accuracy and information content to those obtained using implanted electrodes and direct currents, whilst being capable of being carried out very much more rapidly and easily.

The linear relationship between the quadrature component of the secondary signal and the conductivity of terrain being surveyed is only closely maintained when the coil separation is less than about one tenth of the skin depth; as the conductivity rises so that the coil separation becomes more than one tenth of the skin depth there is an increasingly rapid departure from linearity. Higher conductivities may be measured by decreasing the frequency relative to the inverse square of the coil spacing; for example a reduction of the frequency by a factor of ten yields an increase of a factor of ten in the upper limit of the range over which the quadrature phase component is an accurate measurement of the terrain conductivity. This expedient has the disadvantage of reducing the amplitude of the quadrature component and making it difficult to measure conductivities at the lower end of the range.

Alternatively it is still possible to obtain useful information as to terrain conductivity when the latter is such that the coil separation becomes as high as $1/\sqrt{10}$ of the skin depth, by the application of suitable correction factors to the readings obtained. Although these corrected readings will necessarily be less accurate than those obtained in the normal range of the apparatus, the use of correction factors as discussed above enables the upper limit of conductivity measurable by the apparatus to be extended. In the examples described above, the extension is from about 0.005 to about 0.05 mho/meter without any change in the frequency used. However, it should be noted that this extended range is not part of the normal range of the machine, and references in the appended claims and in the introductory portion of the specification to the maximum terrain conductivity to be measured, or equivalent terminology, should be regarded as referring to the normal upper conductivity range limit of the apparatus.

It should also be noted that at very high terrain conductivities rising to levels well above both the normal and extended ranges of the apparatus, the quadrature component of the secondary signal will actually fall in amplitude, resulting in the theoretical possibility of ambiguous readings when a very high conductivity gives rise to a quadrature component within the normal metering range of the apparatus. In practice, this presents no significant problem since the behaviour of the apparatus at the boundary of such an area of very high conductivity will show a marked and characteristic anomaly, which itself provides an indication of the presence of a highly conductive body in the terrain. The resistivity of such a body once detected can readily be determined by conventional techniques.

The instrument of the present invention can therefore be used to detect high conductivity ore bodies, but its primary usefulness resides in its exceptional ability to survey geological structures of comparatively low conductivity, for which purpose conventional non-contacting electromagnetic surveying techniques are less than ideal.

By not attempting to make the instrument suitable for measuring very low resistivities, it is possible as described above to construct a simple instrument of dimensions suitable to enable it to be carried by one man, which nevertheless is capable of surveying terrain to useful depths. Conventional non-contacting electromagnetic instruments, in which the coil spacing must be at least a substantial proportion of the skin depth, would become too large to be carried by one man if a reasonable range of resistivities were to be surveyed.

Moreover, such a portable instrument may also be utilized to measure the magnetic susceptibility of terrain. By throwing the switches 31 and 33, the instrument is made responsive to the in-phase component of the received secondary signal, and if the meter M is appropriately calibrated, direct readings of terrain susceptibility may be made. When operating in this mode, the relationship of the instrument to the terrain surface becomes important, and it must be calibrated for a specific height and orientation relative to the surface. The exact separation and relative orientation of the coils must also be accurately maintained, since it is very important to maintain precise cancellation of the primary signal received by the coil 8, this signal being very large compared with the wanted signal. This mode of operation is not very practicable with those embodiments of the instrument having large coil spacings and no rigid connection between the coils, both because of the problems of maintaining cancellation of the primary signal and because the wanted secondary in-phase signal becomes very small. For this same reason, it is possible to dispense, in instruments only intended for use with large coil spacings, with the secondary cancellation circuitry comprised by the blocks 38, 40 and 42, because the in-phase component of the secondary signal will no longer be large compared with the quadrature component.

When the instrument is used to measure the magnetic susceptibility of terrain, it is important that the primary signal be precisely cancelled. When the secondary cancellation circuitry is in use while the instrument is used to measure terrain conductivity, the action of this circuitry will mask any minor errors in cancellation of the primary signal, but when the circuitry is disabled, this masking effect disappears.

What we claim is:

1. A direct reading terrain conductivity meter comprising a transmitter coil, a receiving coil horizontally spaced from the transmitter coil above terrain whose conductivity is to be measured, signal generating means connected to the transmitter coil to supply an alternating current thereto, signal processing means connected to receive signals from the receiver coil and the signal generating means and compare said signals so as to isolate from the signal from the receiver any component in quadrature with that from the generating means, and means linearly responsive to the amplitude of said quadrature component and calibrated to provide a direct read out of the conductivity of terrain being surveyed, the spacing D of the coils in meters and the frequency F of the alternating current in Hertz being restricted to values such that D does not substantially exceed about $50/\sqrt{FG}$ where G is the maximum terrain conductivity to be measured in mhos/meter.

2. Apparatus according to claim 1, including means to apply to the signal processing means together with said signal from the receiver coil a cancelling signal derived from the signal generating means which substantially cancels that component of the receiver coil signal which is a primary signal received directly from the transmitter coil, and wherein means are further provided to monitor the signal being processed after cancellation of the primary signal for the presence of an in-phase component of a secondary signal received from the terrain, and to apply a secondary cancelling signal to the signal processing means to minimize this component.

3. A meter according to claim 2, wherein the monitoring means comprises a feedback loop comprising a synchronous detector receiving, together with the received signal modified by addition of the cancelling signals, a first reference signal from the signal generating means of such phase as to detect only an in-phase component of said modified signal and integrator means receiving the output of the synchronous detector to provide an error signal, the means to adjust the amplitude of the secondary cancelling signal being controlled by this error signal.

4. A meter according to claim 3, wherein the signal processing means comprise an amplifier receiving the cancelling signals and the signal from the receiver coil, a synchronous detector receiving both the received signal after addition of the cancelling signals and a second reference signal from the signal generating means, and phase shifter means to adjust the relative phases of the reference and received signals so that only the quadrature component of the latter is detected, the output of the detector being applied to the metering means.

5. Apparatus according to claim 4, further including means to change the relative phases of the received and second reference signals by 90°, and means to open the feedback loop comprised by the monitoring means.

6. Apparatus according to claim 2 wherein the receiver and transmitter coils are mounted at opposite ends of a portable generally horizontally extending boom of fixed length D and the signal generating means has a fixed frequency F, the signal generating means, the signal processing means and the metering means being supported by the boom intermediate its ends.

7. Apparatus according to claim 1, wherein the transmitter coil and the signal generating means are formed as a portable unit, the receiver coil and the signal processing means and the meter are formed as an independently portable unit, and the units are connected by a flexible cable establishing the electrical connections required between the units.

8. Apparatus according to claim 1, wherein the distance between the transmitter coil and the receiver coil is adjustable, and the frequency generated by the signal generating means is correspondingly adjustable so that it remains proportional to the inverse square of the distance between the coils.

9. Apparatus according to claim 8, wherein the frequency F is approximately $10^6/2D^2$.

10. Apparatus according to claim 1, wherein G is approximately 0.05.

11. Apparatus according to claim 1, wherein at least one of D & F is adjustable according to the range of conductivity to be measured whereby to avoid D substantially exceeding $50/\sqrt{FG}$.

12. A method of measuring terrain conductivity comprising generating an alternating current having a frequency F Hertz, and applying the current to a transmitter coil for transmission to the terrain, receiving signals from the terrain by means of a receiver coil spaced from the transmitter coil above the terrain by a distance D of not more than about $50/\sqrt{FG}$ where G is the highest terrain conductivity to be measured in mhos/meter, isolating the quadrature component of the received signal, and using the amplitude of said signal as a linear indicator of terrain conductivity.

13. A method according to claim 12, including the step of independently cancelling the primary component of the received signal received direct from the transmitter coil and the in-phase component of the secondary signal received from the terrain.

14. A method according to claim 12, comprising applying alternating currents at different frequencies F to the transmitter coil whilst altering the distance D so that F remains in the same relationship to the inverse square of D, so as to measure the resistivity of different depths of terrain.

15. A method of measuring terrain conductivity up to a maximum of about G mhos/meter, comprising generating a signal at a frequency F Hertz and applying it to a transmitter coil mounted on a structure portable over terrain whose resistivity is to be measured, receiving signals from said transmitter coil by means of a receiver coil mounted on said structure at a distance D meters from said transmitting coil, where D is not more than about $50/\sqrt{FG}$, generating a cancellation signal and combining it with the signal received by the receiver coil, the cancellation signal having a first, preset component equal and opposite to a primary signal received by the receiver coil directly from the transmitter coil, and a second variable component equal and opposite to the in-phase component of a secondary signal received by the receiver coil from the terrain as a result of currents induced therein by the primary signal from the transmitter coil, and synchronously detecting the combined signal on a phase axis in quadrature to the transmitted signal to provide an output whose amplitude is directly proportional to the conductivity of the ground.

16. A method according to claim 15, wherein the second, variable component of the cancellation signal is generated by synchronously detecting the combined signal on the phase axis of the transmitted signal so as to derive an error signal which is multiplied with a signal derived from the transmitted signal to provide said variable component.

17. A method according to claim 14, including the further step of measuring the magnetic susceptibility of the terrain, by ceasing to apply the second component of the cancellation signal, and changing the phase axis on which the combined signal is detected by 90°, so that the output is proportional to the magnetic susceptibility of the terrain.

* * * * *